United States Patent
Kerner et al.

(10) Patent No.: US 9,843,959 B2
(45) Date of Patent: Dec. 12, 2017

(54) INTERFERENCE MITIGATION BY A SCALABLE DIGITAL WIRELESS MODEM

(71) Applicant: Intel IP Corporation, Santa Clara, CA (US)

(72) Inventors: Michael Kerner, Netanya (IL); Uri Parker, Shimshit (IL); Avi Gazneli, Rehovot (IL); Nati Dinur, Haifa (IL)

(73) Assignee: Intel IP Corporation, Santa Clara, CA (US)

( * ) Notice: Subject to any disclaimer, the term of this patent is extended or adjusted under 35 U.S.C. 154(b) by 133 days.

(21) Appl. No.: 14/872,039

(22) Filed: Sep. 30, 2015

(65) Prior Publication Data
US 2017/0094551 A1    Mar. 30, 2017

(51) Int. Cl.
| | |
|---|---|
| *H04J 11/00* | (2006.01) |
| *H04W 24/02* | (2009.01) |
| *H04W 28/02* | (2009.01) |
| *H04W 84/12* | (2009.01) |
| *H04W 24/08* | (2009.01) |

(52) U.S. Cl.
CPC ......... *H04W 28/0236* (2013.01); *H04J 11/00* (2013.01); *H04W 24/02* (2013.01); *H04W 24/08* (2013.01); *H04W 84/12* (2013.01)

(58) Field of Classification Search
CPC ...... H04B 1/525; H04B 1/1036; H04B 15/00; H04B 17/345; H04W 24/02; H04W 24/08; H04W 24/10; H04W 28/0236; H04W 72/1215; H04W 84/12; H04L 5/0066
See application file for complete search history.

(56) References Cited

U.S. PATENT DOCUMENTS

| | | | | |
|---|---|---|---|---|
| 4,829,554 A * | 5/1989 | Barnes | ................. | H04W 84/042 455/432.1 |
| 5,799,071 A * | 8/1998 | Azar | ....................... | H04M 1/27 379/114.02 |
| 5,999,810 A * | 12/1999 | Fuentes | ............. | H04M 3/42229 455/417 |
| 6,085,077 A * | 7/2000 | Fields | ................. | H03H 17/0266 342/13 |
| 6,230,970 B1 * | 5/2001 | Walsh | .................. | G06K 7/0004 235/379 |
| 6,307,862 B1 * | 10/2001 | Silverman | ........... | H04L 12/2801 370/345 |
| 6,307,877 B1 * | 10/2001 | Philips | ..................... | G06F 8/10 375/130 |

(Continued)

FOREIGN PATENT DOCUMENTS

EP    3119152 A1 *    1/2017    ........ H04W 72/1215

OTHER PUBLICATIONS

International Search Report and Written Opinion received for PCT Patent Application No. PCT/US2016/048160, dated Dec. 28, 2016, 13 pages.

*Primary Examiner* — Benjamin H Elliott, IV
*Assistant Examiner* — Eric Nowlin
(74) *Attorney, Agent, or Firm* — Schiff Hardin LLP

(57) ABSTRACT

Described herein are technologies related to an implementation for dynamic adjustment of an out-of-band emission in a wireless modem, including spurious emissions, such as a Wi-FI modem, to minimize interference on a collocated or co-running downlink reception of another wireless modem residing on the same device by dynamically adjustment of a power consumption.

21 Claims, 3 Drawing Sheets

(56) References Cited

U.S. PATENT DOCUMENTS

| | | | | |
|---|---|---|---|---|
| 6,633,208 B2* | 10/2003 | Salkola | H01P 1/20 | 333/167 |
| 6,745,937 B2* | 6/2004 | Walsh | G06K 7/084 | 235/379 |
| 7,151,795 B1* | 12/2006 | Goldburg | H04W 52/34 | 375/227 |
| 7,336,716 B2* | 2/2008 | Maltsev | H03F 1/3247 | 375/260 |
| 7,366,202 B2 | 4/2008 | Scherzer et al. | | |
| 7,512,380 B2* | 3/2009 | McGowan | H03J 1/0066 | 455/41.2 |
| 7,519,323 B2* | 4/2009 | Mohebbi | H04B 7/15507 | 455/11.1 |
| 7,551,577 B2* | 6/2009 | McRae | H04W 88/06 | 370/328 |
| 7,606,529 B1* | 10/2009 | Swan | H04L 12/2801 | 455/3.06 |
| 7,724,753 B2* | 5/2010 | Naqvi | H04M 7/123 | 370/410 |
| 7,826,837 B1* | 11/2010 | Sylvester | H04W 24/06 | 455/423 |
| 7,876,888 B2* | 1/2011 | Chatterjee | H04M 3/42263 | 370/259 |
| 8,094,679 B2* | 1/2012 | King | H04L 45/22 | 370/466 |
| 8,195,146 B2* | 6/2012 | Prakash | H04L 67/125 | 455/419 |
| 8,195,218 B1* | 6/2012 | Swan | H04L 12/2801 | 370/463 |
| 8,289,864 B2* | 10/2012 | Dolganow | H04W 76/068 | 370/252 |
| 8,316,232 B1* | 11/2012 | Osburn, III | H04L 9/0838 | 713/164 |
| 8,346,196 B2* | 1/2013 | Haralabidis | H04B 1/0475 | 455/255 |
| 8,346,850 B2* | 1/2013 | Eriksson | H04L 29/12066 | 370/260 |
| 8,364,950 B1* | 1/2013 | Osburn, III | G05B 19/042 | 713/153 |
| 8,428,179 B1* | 4/2013 | Xu | H04L 27/2624 | 375/259 |
| 8,429,759 B2* | 4/2013 | Adrangi | H04W 12/12 | 340/500 |
| 8,472,535 B2* | 6/2013 | Wallen | H04W 52/367 | 375/260 |
| RE44,412 E* | 8/2013 | Naqvi | H04M 7/123 | 370/410 |
| 8,515,547 B2* | 8/2013 | Mass | A61N 1/37282 | 607/60 |
| 8,615,593 B2* | 12/2013 | Ch'ng | H04W 48/08 | 455/432.1 |
| 8,660,015 B2* | 2/2014 | Issakov | G01S 5/0221 | 370/246 |
| 8,670,790 B2* | 3/2014 | Ford | H04M 1/72547 | 455/414.1 |
| 8,694,770 B1* | 4/2014 | Osburn, III | G05B 19/042 | 713/153 |
| 8,731,560 B2* | 5/2014 | Song | H04W 56/001 | 370/350 |
| 8,750,265 B2* | 6/2014 | Scherzer | H04W 48/14 | 370/338 |
| 8,780,872 B1* | 7/2014 | Ramamurthy | H04B 7/024 | 370/328 |
| 8,781,420 B2* | 7/2014 | Schlub | H01Q 1/243 | 455/115.1 |
| 8,818,522 B2* | 8/2014 | Mass | A61N 1/37282 | 607/30 |
| 8,880,019 B1* | 11/2014 | Daly | H04H 20/59 | 455/404.1 |
| 8,885,635 B2* | 11/2014 | Linkola | H04W 12/08 | 370/352 |
| 8,887,212 B2* | 11/2014 | Dua | H04N 7/163 | 380/201 |
| 8,898,481 B1* | 11/2014 | Osburn, III | H04L 63/0471 | 713/192 |
| 8,935,523 B1* | 1/2015 | Osburn, III | H04L 9/0838 | 713/153 |
| 9,049,699 B2* | 6/2015 | Touboul | H04W 72/04 | |
| 9,118,753 B2* | 8/2015 | Harrison | H04M 1/24 | |
| 9,125,134 B2* | 9/2015 | Das | H04W 48/08 | |
| 9,130,641 B2* | 9/2015 | Mohebbi | H04B 7/15535 | |
| 9,178,539 B2* | 11/2015 | Sutton | H04B 1/0475 | |
| 9,215,040 B2* | 12/2015 | Yang | H04B 7/15542 | |
| 9,225,498 B2* | 12/2015 | Smith | H04L 5/001 | |
| 9,258,833 B2* | 2/2016 | Bitran | H04W 16/14 | |
| 9,264,925 B2* | 2/2016 | Zhao | H04W 24/08 | |
| 9,288,672 B2* | 3/2016 | Benoit | H04W 12/06 | |
| 9,369,370 B2* | 6/2016 | Chow | H04L 41/083 | |
| 9,369,995 B2* | 6/2016 | Chakrabarti | H04L 67/12 | |
| 9,380,610 B2* | 6/2016 | Yerrabommanahalli | H04W 76/007 | |
| 9,386,480 B2* | 7/2016 | Papa | H04W 28/10 | |
| 9,401,874 B2* | 7/2016 | Sun | H04L 49/253 | |
| 9,426,729 B2* | 8/2016 | Pazhyannur | H04W 48/18 | |
| 9,438,286 B2* | 9/2016 | Benjamin | H04B 1/1027 | |
| 9,509,351 B2* | 11/2016 | Shaw | H04B 1/10 | |
| 9,525,499 B2* | 12/2016 | Jakoby | H04B 17/21 | |
| 9,544,323 B2* | 1/2017 | Porcello | H04L 63/0272 | |
| 9,565,046 B2* | 2/2017 | Van De Beek | H04L 25/03834 | |
| 9,609,488 B2* | 3/2017 | Sukumar | H04W 4/06 | |
| 9,648,591 B2* | 5/2017 | Rastogi | H04W 72/0406 | |
| 9,681,331 B2* | 6/2017 | Lindoff | H04W 28/048 | |
| 9,698,845 B2* | 7/2017 | Talty | H04B 1/3822 | |
| 2001/0021641 A1* | 9/2001 | Kaine | H04M 3/30 | 455/67.11 |
| 2002/0008145 A1* | 1/2002 | Walsh | G06K 7/084 | 235/462.46 |
| 2002/0067757 A1* | 6/2002 | Philips | G06F 8/10 | 375/130 |
| 2002/0093926 A1* | 7/2002 | Kilfoyle | H04B 7/2606 | 370/335 |
| 2003/0118081 A1* | 6/2003 | Philips | G06F 8/10 | 375/130 |
| 2004/0052314 A1 | 3/2004 | Copeland | | |
| 2004/0085096 A1* | 5/2004 | Ward | G01P 15/08 | 327/2 |
| 2006/0008028 A1* | 1/2006 | Maltsev | H03F 1/3247 | 375/297 |
| 2006/0009243 A1* | 1/2006 | Dahan | H04L 51/04 | 455/466 |
| 2006/0014559 A1* | 1/2006 | Raman | H04M 1/656 | 455/550.1 |
| 2006/0161797 A1 | 7/2006 | Grass et al. | | |
| 2006/0172781 A1* | 8/2006 | Mohebbi | H04B 7/15535 | 455/571 |
| 2006/0221917 A1* | 10/2006 | McRae | H04W 88/06 | 370/338 |
| 2006/0294244 A1* | 12/2006 | Naqvi | H04M 7/123 | 709/227 |
| 2007/0072606 A1* | 3/2007 | van Rooyen | H04H 20/57 | 455/434 |
| 2007/0155314 A1* | 7/2007 | Mohebbi | H04B 7/15507 | 455/11.1 |
| 2007/0223679 A1* | 9/2007 | Chatterjee | H04M 3/42263 | 379/211.02 |
| 2007/0232246 A1 | 10/2007 | Lozhkin et al. | | |
| 2007/0250872 A1* | 10/2007 | Dua | H04N 7/163 | 725/81 |
| 2008/0025440 A1 | 1/2008 | Sanada et al. | | |
| 2008/0130767 A1 | 6/2008 | Lozhkin | | |
| 2008/0171560 A1* | 7/2008 | Olbers | H04W 12/12 | 455/456.6 |
| 2009/0062887 A1* | 3/2009 | Mass | A61N 1/37282 | 607/60 |
| 2009/0109981 A1* | 4/2009 | Keselman | H04B 3/544 | 370/400 |
| 2009/0164547 A1* | 6/2009 | Ch'ng | H04W 48/08 | 709/201 |

(56) References Cited

U.S. PATENT DOCUMENTS

| | | | |
|---|---|---|---|
| 2009/0282155 A1* | 11/2009 | Ali | H04W 76/022 709/228 |
| 2010/0014507 A1* | 1/2010 | Linkola | H04W 12/08 370/352 |
| 2010/0054231 A1* | 3/2010 | Dolganow | H04W 76/068 370/349 |
| 2010/0239031 A1* | 9/2010 | Wallen | H04W 52/367 375/260 |
| 2010/0251391 A1* | 9/2010 | Adrangi | H04W 12/12 726/34 |
| 2010/0279617 A1* | 11/2010 | Osman | H04B 17/104 455/63.1 |
| 2010/0317289 A1* | 12/2010 | Desai | H04B 17/318 455/41.2 |
| 2011/0013569 A1* | 1/2011 | Scherzer | H04W 48/14 370/329 |
| 2011/0116490 A1* | 5/2011 | Wilhelmsson | H04W 16/14 370/343 |
| 2011/0151854 A1* | 6/2011 | Prakash | H04L 67/125 455/419 |
| 2011/0250928 A1* | 10/2011 | Schlub | H01Q 1/243 455/550.1 |
| 2012/0040620 A1* | 2/2012 | Fu | H04B 1/1027 455/63.1 |
| 2012/0046025 A1* | 2/2012 | Das | H04W 48/08 455/422.1 |
| 2012/0140860 A1* | 6/2012 | Rimini | H04B 1/525 375/350 |
| 2012/0207032 A1* | 8/2012 | Chen | H04W 28/18 370/252 |
| 2012/0207040 A1 | 8/2012 | Comsa et al. | |
| 2012/0236766 A1* | 9/2012 | Haralabidis | H04B 1/0475 370/280 |
| 2012/0269286 A1* | 10/2012 | Huang | H04L 5/0007 375/295 |
| 2012/0309352 A1* | 12/2012 | Fang | H04L 63/08 455/411 |
| 2013/0014263 A1* | 1/2013 | Porcello | H04L 63/0272 726/25 |
| 2013/0044842 A1* | 2/2013 | Wang | H04L 27/08 375/345 |
| 2013/0065623 A1* | 3/2013 | Gummadi | H04B 1/0475 455/501 |
| 2013/0077542 A1* | 3/2013 | Yang | H04B 7/15542 370/280 |
| 2013/0163440 A1* | 6/2013 | Issakov | G01S 5/0221 370/246 |
| 2013/0188578 A1 | 7/2013 | Touboul et al. | |
| 2013/0203457 A1* | 8/2013 | Zhang | H04B 15/005 455/522 |
| 2013/0244653 A1* | 9/2013 | Song | H04W 56/001 455/436 |
| 2013/0244723 A1* | 9/2013 | Yerrabommanahalli | H04W 48/16 455/552.1 |
| 2013/0268277 A1* | 10/2013 | Duplan | H04W 4/008 704/500 |
| 2013/0272260 A1* | 10/2013 | Bitran | H04W 16/14 370/329 |
| 2013/0310896 A1* | 11/2013 | Mass | A61N 1/37282 607/60 |
| 2013/0326089 A1* | 12/2013 | Harrison | H04M 1/24 710/5 |
| 2013/0337819 A1* | 12/2013 | Qin | H04L 12/2856 455/446 |
| 2014/0030981 A1* | 1/2014 | Shaw | H04B 1/10 455/63.1 |
| 2014/0032143 A1* | 1/2014 | Luo | G01R 19/2513 702/64 |
| 2014/0073258 A1* | 3/2014 | Burchill | H04B 1/123 455/63.1 |
| 2014/0146727 A1* | 5/2014 | Segev | H04W 76/023 370/311 |
| 2014/0148179 A1* | 5/2014 | Das | H04B 1/7107 455/452.1 |
| 2014/0273869 A1* | 9/2014 | Zhao | H04W 24/08 455/67.11 |
| 2014/0273950 A1* | 9/2014 | Li | G06F 3/0481 455/410 |
| 2014/0321298 A1* | 10/2014 | Chow | H04L 41/083 370/252 |
| 2014/0337957 A1* | 11/2014 | Feekes | H04L 63/0853 726/9 |
| 2015/0016260 A1* | 1/2015 | Chow | H04L 45/22 370/235 |
| 2015/0052255 A1* | 2/2015 | Sun | H04L 49/253 709/227 |
| 2015/0065157 A1* | 3/2015 | Homchaudhuri | H04W 72/082 455/452.1 |
| 2015/0078167 A1* | 3/2015 | Papa | H04W 28/10 370/235 |
| 2015/0087351 A1* | 3/2015 | Majjigi | H04W 52/52 455/522 |
| 2015/0089216 A1* | 3/2015 | Benoit | H04W 12/06 713/156 |
| 2015/0110089 A1* | 4/2015 | Pazhyannur | H04W 48/18 370/338 |
| 2015/0110216 A1 | 4/2015 | Bajcsy et al. | |
| 2015/0121470 A1* | 4/2015 | Rongo | H04L 41/0813 726/4 |
| 2015/0208195 A1* | 7/2015 | Kariman | H04W 4/02 455/456.1 |
| 2015/0223111 A1* | 8/2015 | Lindoff | H04W 24/02 370/252 |
| 2015/0223176 A1* | 8/2015 | Janani | H04W 52/226 455/127.1 |
| 2015/0245332 A1* | 8/2015 | Chakrabarti | H04L 67/12 370/329 |
| 2015/0245388 A1* | 8/2015 | Yerrabommanahalli | H04W 76/007 455/404.1 |
| 2015/0318964 A1* | 11/2015 | Abdelmonem | H04L 5/006 370/329 |
| 2015/0373724 A1* | 12/2015 | Ibrahim | H04W 24/08 370/252 |
| 2016/0036614 A1* | 2/2016 | Van De Beek | H04L 25/03834 375/295 |
| 2016/0036628 A1* | 2/2016 | Gupta | H04W 4/005 455/420 |
| 2016/0043827 A1* | 2/2016 | Filson | H04K 3/22 370/252 |
| 2016/0050653 A1* | 2/2016 | Rastogi | H04W 72/0406 455/453 |
| 2016/0057765 A1* | 2/2016 | Jiang | H04W 16/10 370/329 |
| 2016/0127906 A9* | 5/2016 | Li | G06F 3/0481 455/410 |
| 2016/0134621 A1* | 5/2016 | Palanigounder | H04W 12/06 713/156 |
| 2016/0149602 A1* | 5/2016 | Benjamin | H04B 1/1027 375/346 |
| 2016/0191178 A1* | 6/2016 | Jakoby | H04B 17/21 455/63.1 |
| 2016/0241280 A1* | 8/2016 | Van der Goes | H04B 1/10 |
| 2016/0259923 A1* | 9/2016 | Papa | G06F 21/105 |
| 2016/0316394 A1* | 10/2016 | Papa | H04L 12/4633 |
| 2016/0322997 A1* | 11/2016 | Wloczysiak | H03G 3/20 |
| 2017/0078133 A1* | 3/2017 | Terry | H04W 24/08 |

* cited by examiner

INTERFERENCE MITIGATION BY A SCALABLE DIGITAL WIRELESS MODEM

BACKGROUND

Wireless communication systems may use one or more channels to transfer data between a transmitter and receivers. These communication systems may operate according to a set of standards defined by the Institute of Electrical and Electronics Engineers (IEEE) 802.11 committee for Wireless Local Area Network (WLAN) communication.

During the transfer of data between the transmitter and receivers, multipath problems and other conditions such as presence of harmonic spurs may affect transmission and reception of data packets. The harmonic spurs or other interference may be generated by co-running modems within the same portable device. The presence of the harmonic spurs or the interference that may mix with the receiving of the data packets, for example, may cause problems with signal detecting, amplifier gain adjustment, and signal decoding among others.

As such, there is a need to mitigate presence of interference between co-running modems especially for a wireless fidelity (Wi-Fi) modem which is usually treated as an aggressor component with respect to collocated and co-running downlink cellular receiver such as long term evolution (LTE) modem.

DETAILED DESCRIPTION

Described herein is a technology for implementing a method for dynamic adjustment of an out-of-band emission, including spurious emissions, in a wireless modem, such as a Wi-Fi modem, to minimize interference with a collocated and/or co-running downlink reception of another modem. For example, the co-running downlink reception of another modem includes cellular reception, Blue Tooth (BT) reception, and the like, within the same portable device.

As described in certain examples herein, the wireless modem is implemented as a digital Wi-Fi modem with a programmable chain of components that may be dynamically adjusted to control an out-of-band emission the Wi-Fi modem. For example, when a co-running or collocated downlink cellular reception of an Long Term Evolution (LTE) modem is active, then the Wi-Fi modem may adjust number of parallel hardware streams that are used within the programmable chain of components of the Wi-Fi modem. Similarly, when the LTE modem is not active, then the Wi-Fi modem may limit the number of parallel hardware streams to process input data streams for transmission. The limited number of active parallel hardware streams within the programmable chain of components may conserve power in the portable device. Furthermore, in these examples, the Wi-Fi modem may minimize generation of interference to LTE signals of the co-running downlink cellular reception. The Wi-Fi modem and the LTE modem, in these examples, are collocated within the same device.

In an implementation, a detector (in certain implementations, using pre-engineering configurations, the detector may not be implemented) is further coupled to the Wi-Fi modem (or victim modem) in order to detect and compare amount of Wi-Fi modem generated-interference with a threshold. For example, the out-of-band emission, including spurious emissions, of the Wi-Fi modem is high enough to generate interference on the LTE signal of the co-running downlink cellular reception. In this example, the threshold includes a pre-configured amount that is utilized as a reference for controlling the out-of-band emission, including spurious emission, of the Wi-Fi modem.

Figure 1:
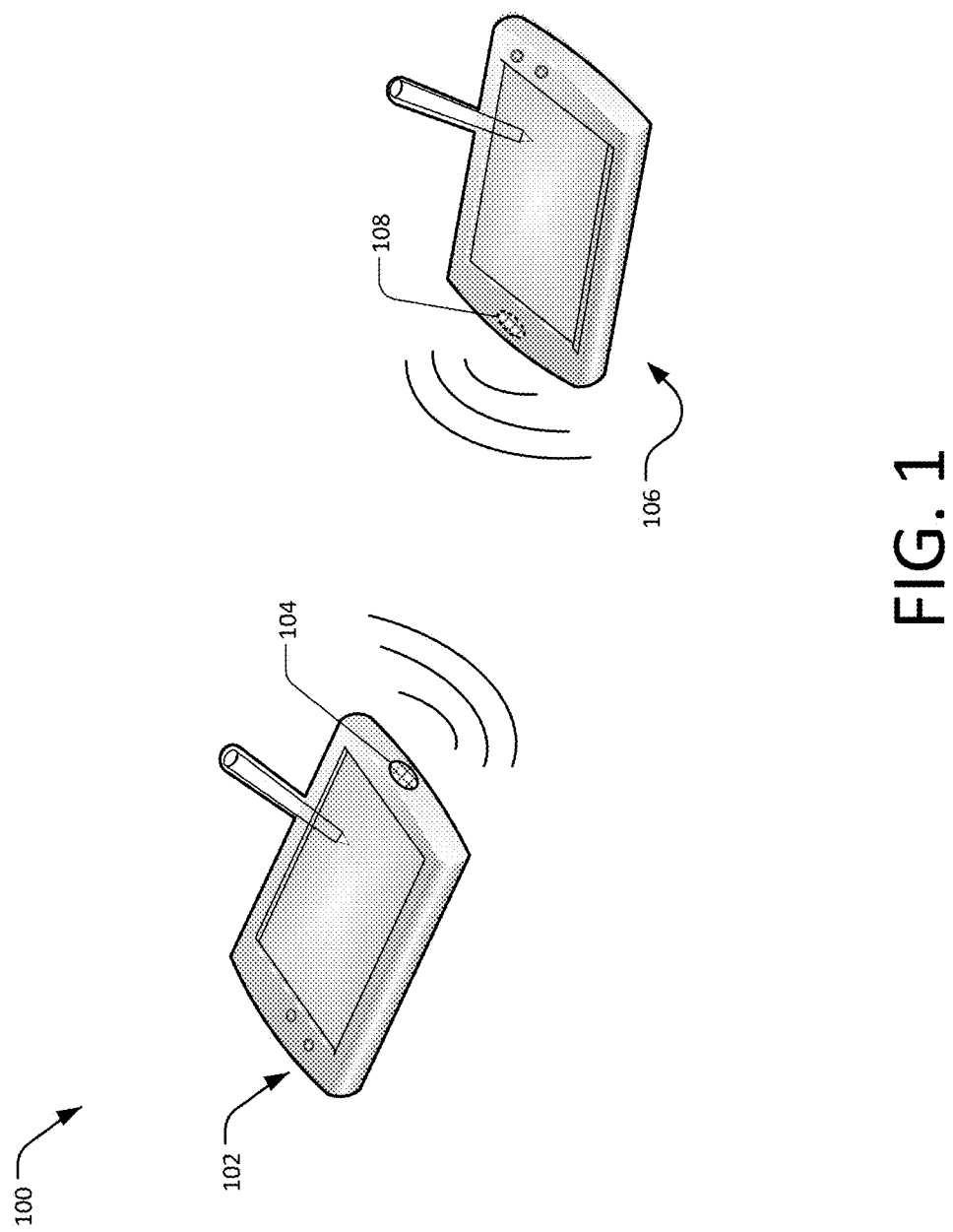
FIG. 1 illustrates an example scenario that implements dynamic adjustment of an out-of-band emission in a Wi-Fi modem to mitigate resulting interference to a signal of another co-running modem within the same portable device.

FIG. 1 is an example scenario 100 that utilizes a dynamic adjustment of out-of-band emission in a Wi-Fi modem to mitigate resulting interference to a signal of another co-running modem within the same portable device. The scenario 100 shows a portable device 102 with an antenna 104, and another portable device 106 with an antenna 106.

The portable devices 102 or 106 may include, but is not limited to, a tablet computer, a netbook, a notebook computer, a laptop computer, mobile phone, a cellular phone, a smartphone, a personal digital assistant, a multimedia playback device, a digital music player, a digital video player, a navigational device, a digital camera, and the like.

The portable device 102, for example, may communicate with the other portable device 106 in a network environment. The network environment, for example, includes a cellular network configured to facilitate communications between the portable device 102 and the other portable device 106. During this cellular network communications, cellular downlink reception, for example, of the portable device 102 may be affected or may receive interference from co-running and collocated Wi-Fi communication features. Thus, the implementations described herein may facilitate the interference or harmonic spurs mitigation, for example, of interfering Wi-Fi signals to the cellular downlink reception or any downlink reception within the portable device 102. Furthermore, the implementations described herein conserves power consumption in the portable device by dynamically adjusting Wi-Fi modem out-of-band emission, including spurious emissions, depending upon whether the co-running modem is active or inactive.

Figure 2:
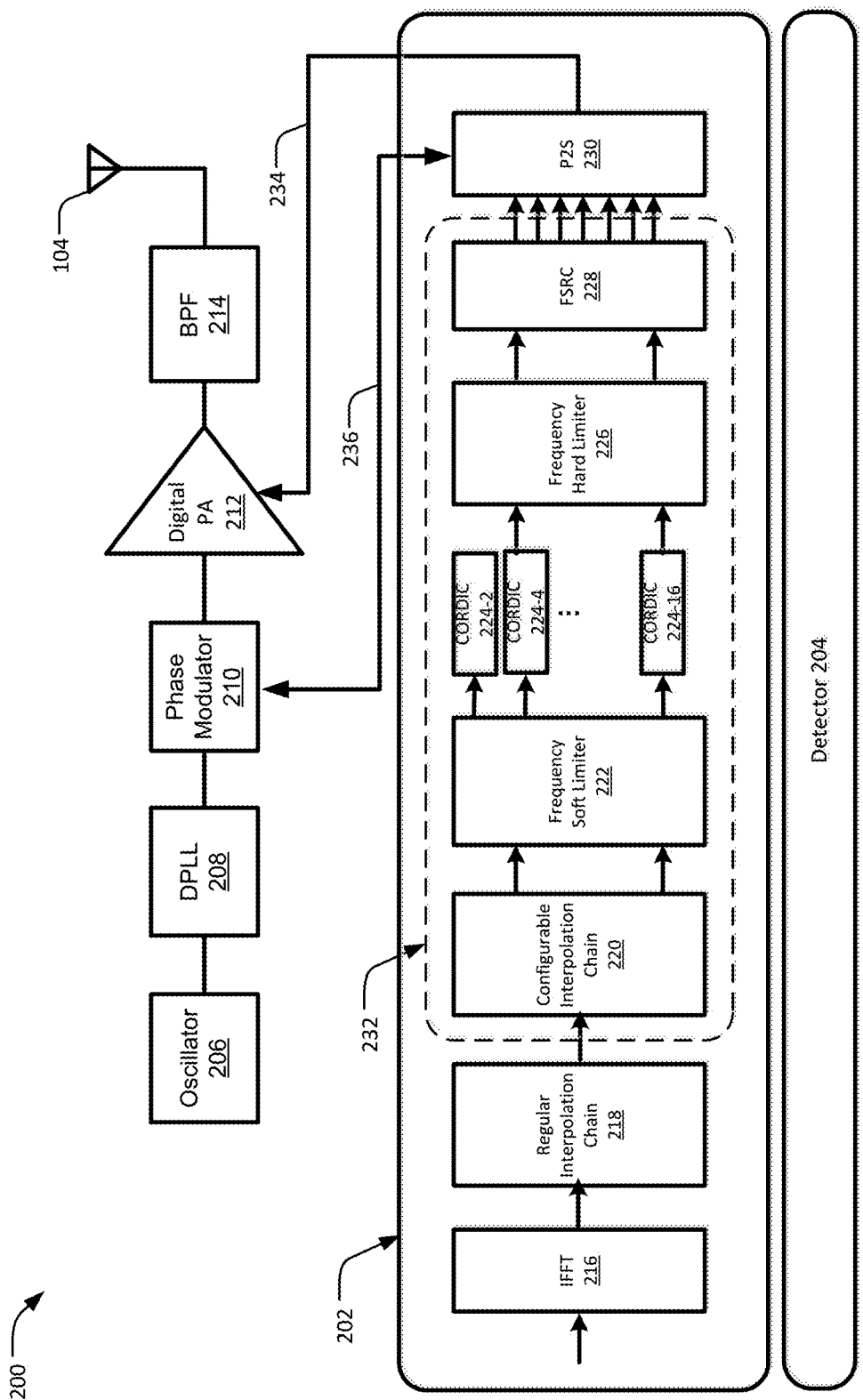
FIG. 2 is an example block diagram showing components of a transceiver circuitry in a portable device.

FIG. 2 is an example schematic block diagram 200 showing components of a transceiver circuitry in a portable device 200. As shown, the example block diagram 200 include a Wi-Fi modem 202, a detector 204, and basic component of a polar digital transmitter such as oscillator 206, digital phase locked loop (DPLL) 208, a phase modulator 210, digital power amplifier (PA) 212, and a band pass filter 214. The Wi-Fi modem further includes an IFFT 216, a regular interpolation chain 218, a configurable interpolation chain 220, a frequency soft limiter 222, CORDIC 224, frequency hard limiter 226, fractional sampling rate converter (FSRC) 228, and a parallel to serial converter (P2S) 230. Furthermore still, the Wi-Fi modem 202 includes a programmable chain component 232 that indicates the components that may be digitally adjusted to control out-of-band emission, including spurious emissions, of the Wi-Fi modem as described herein. The programmable components include the configurable interpolation chain 220, frequency soft limiter 222, CORDICs 224, frequency hard limiter 226, and the FSRC 228. It is also to be understood that the block diagram 200 may include or coupled to one or more processors and one or more memory components.

As a general overview of the implementations described herein, transmission of data packets from the Wi-Fi modem 202 may generate interference to collocated and/or co-running downlink reception in an LTE modem, BT modem, and the like, within the portable device 102. The generated interference may be detected and measured by the detector 204, and the measured interference is utilized by the Wi-Fi modem 202 to adjust its out-of-band emission. For example, the Wi-Fi modem 202 is configured to adjust components within the programmable chain component 232 in order to dynamically adjust out-of-band emission, including spurious emissions, during the transmission of data packet. In this example, the dynamic adjustment may depend upon whether the co-running LTE modem, BT modem, etc. is active or inactive during the transmission of data packet by the Wi-Fi modem 202. In case of active LTE modem, for example, the Wi-Fi modem 202 may be switched to have a high power consumption mode. On the other hand, in case of inactive LTE modem, the Wi-Fi modem 202 may be dynamically switched to have a low power consumption mode.

In an implementation, a serial symbol stream of quadrature modulated data such as phase shift keying (PSK) or quadrature amplitude modulation (QAM) data is converted, for example, into M parallel streams. These M streams are then modulated onto M subcarriers via the use of size N (M<=N) IFFT 216. The N modulated outputs of the IFFT 216 are then processed through the regular interpolation chain 218 and the configurable interpolation chain 220, which perform corresponding order of interpolation to achieve, for example, desired up-sampling rates (e.g., 320 MSa/s). The N modulated outputs of the IFFT 216 may include input signals (i.e., serial symbol stream) that were converted from frequency domain to time domain input signals.

With the interpolated signal from the output of the configurable interpolation chain 220, the frequency soft limiter 222 is configured to limit frequency deviation of the interpolated signal. The streaming of the soft limited interpolated signal are then controlled by the CORDIC 224 depending upon an amount of interference as detected and measured by the detector 204.

For example, the detector 204 detects an active LTE modem that is receiving LTE signals during transmission of data packets by the Wi-Fi modem 202. In this example, the CORDIC 224 is configured to activate its eight parallel hardware streams within the programmable chain component 232. The eight parallel hardware streams may utilize the CORDICs 224-2 to 224-16, respectively. It is to be understood that a CORDIC is described; however, similar components/computers may be implemented.

In another example, the detector 204 detects an inactive LTE modem (i.e., OFF) during transmission of data packets by the Wi-Fi modem 202. In this example, the CORDIC 224 is configured to activate its two parallel hardware streams within the programmable chain component 232. The two parallel hardware streams may utilize the CORDICs 224-2 to 224-4, respectively. Controlling the number of hardware streams may a tradeoff of hardware consumption versus out-of-band emission.

With continuing reference to FIG. 2, the frequency hard limiter 226 is configured to perform hard limiting or clipping of the output of the CORDICs 224. For example, the output of the CORDICs 224 may be strictly limited to a certain amount prior to processing by the FSRC 228. In this example, the FSRC 228 is configured to sample the hard limited output signal of the CORDICs 224 to a desired sampling rate or to another different sampling rate. That is, the hard limited output signal of the CORDICs 224 may have different sampling rates and as such, the FSRC 228 may implement a new sampling rate to interconnect the hard limited output signals with different sampling rates.

After sampling of the FSRC 228 to interconnect the hard limited output signals with different sampling rates, the P2S 230 may convert parallel data streams from the FSRC 228 to serial data streams 234. As shown, the serial data streams 234 may be utilized to amplitude modulate a phase modulated signal at the digital PA 214.

The phase modulated signal, which is received by the digital PA 214 from the phase modulator 210, may be dictated by control signals 236 from the P2S 230. That is the control signals 236 may include control words that dictates phase changes in a carrier signal at the phase modulator 210. For example, the carrier signal, are facilitated by the oscillator 206 and the DPLL 208.

With quadrature modulated signal from an output of the digital PA 212, the BPF 214 may attenuate unwanted replicas prior to transmission at the antenna 104.

Although the example block diagram 200 illustrates in a limited manner basic components of the transceiver of the portable device, other components such as battery, one or more processors, SIM card, etc. were not described in order to simplify the embodiments described herein.

Figure 3:
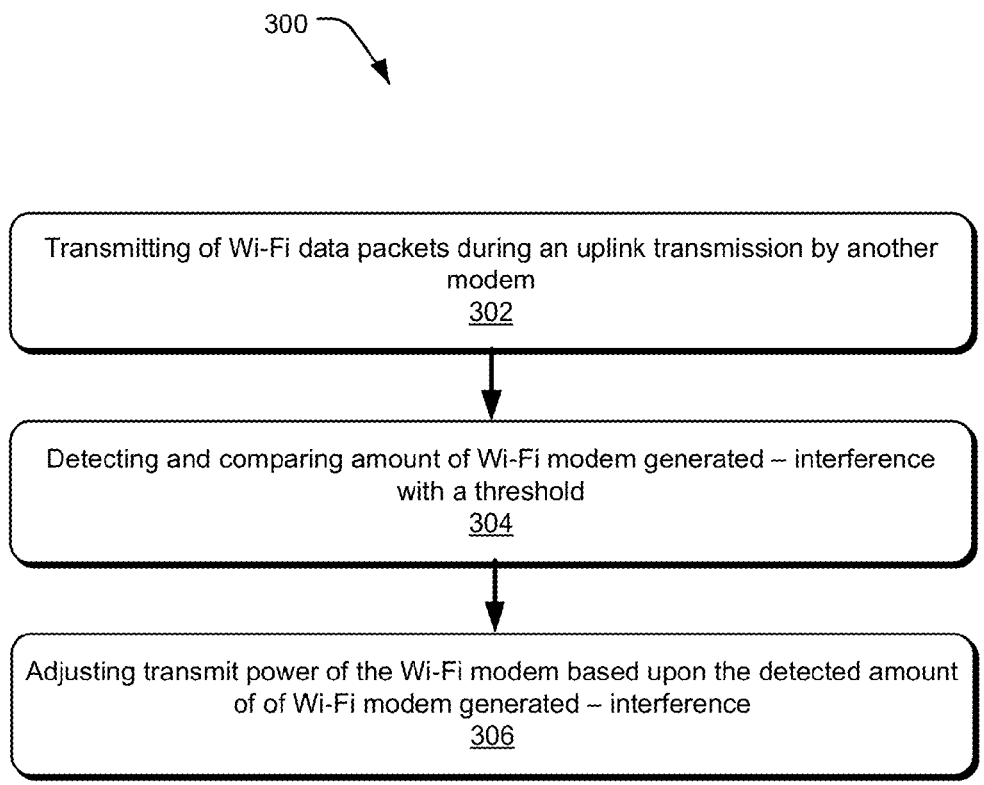
FIG. 3 illustrates an exemplary process for implementing dynamic adjustment of an out-of-band emission in a Wi-Fi modem to minimize interference on a collocated or co-running downlink reception of another modem.

FIG. 3 shows an example process flowchart 300 illustrating an example method for dynamic adjustment of an out-of-band emission, including spurious emissions, in a Wi-Fi modem to minimize interference on a collocated or co-running downlink reception of another modem. For example, the downlink reception of the other modem includes cellular reception, BT reception, and the like, within the same portable device. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 302, transmitting Wi-Fi data packets by a Wi-Fi modem during a downlink reception of another modem is performed. For example, the Wi-Fi modem 202 is transmitting Wi-Fi data packets during downlink cellular reception operation by the LTE modem. In this example, the Wi-Fi modem 204 may be operating a high out-of-band emission level that may interfere with LTE signals of co-running downlink cellular reception.

At block 304, detecting and comparing amount of Wi-Fi modem generated-interference with a threshold is performed. For example, the detector 204 is configured to detect and measure amount of interference that may be generated by the Wi-Fi modem 202 to the co-running downlink cellular reception. In this example, the measured amount of interference is compared to the pre-configured threshold that is utilized as a reference for controlling out-of-band emission level in the Wi-Fi modem 202. Particularly, the out-of-band emission level is controlled through an adjustment of components within the programmable chain component 232.

At block 306, adjusting out-of-band emission of the Wi-Fi modem based upon the detected amount of Wi-Fi modem generated interference is performed. For example, when the amount of Wi-Fi modem generated interference exceeds the threshold, the Wi-Fi modem 202 may lower its out-of-band emission level to minimize interference to the co-running downlink cellular reception.

In another implementation, the Wi-Fi modem 202 may be co-running with the BT modem of the same portable device, and to this end, similar implementations as described above for the co-running 2G, LTE, 4G, and the like, may be applied. That is, the detector 204 implements an algorithm that measures and determines the unwanted harmonic frequencies due to the transmitting operations of the Wi-Fi modem 202. The determined unwanted harmonic frequencies are compared to the threshold and the Wi-Fi modem 202 is adjusted accordingly to minimize the interference.

Example is a method of interference mitigation, the method comprising: transmitting data packets by a wireless modem during a downlink cellular reception; detecting and comparing an amount of wireless modem generated-interference with a threshold value; and adjusting out-of-band emission level of the wireless modem based on a detected amount of wireless modem generated interference, wherein adjusting the out-of-band emission level comprises adjusting a programmable chain component of the wireless modem.

In example 2, the method as recited in example 1, wherein a co-running downlink cellular reception includes one of a 2G, 3G, or a long term evolution (LTE) signal.

In example 3, the method as recited in example 1, wherein the threshold is a reference for controlling the out-of-band emission level of the wireless modem.

In example 4, the method as recited in example 1, wherein adjusting the out-of-band emission level of the Wi-Fi modem further comprises: controlling number of hardware streams as a tradeoff of power consumption versus the out-of-band emission level.

In example 5, the method as recited in example 4, wherein controlling the number of hardware streams is performed by a Coordinate Rotation Digital Computer (CORDIC) component of the wireless modem.

In example 6, the method of example 5, wherein the CORDIC comprises eight hardware streams of about 320 MSa/s per stream.

In example 7, the method as recited in example 5, wherein the CORDIC component is configured to activate about eight or more parallel hardware streams during a co-running downlink cellular reception.

In example 8, the method as recited in example 5, wherein the CORDIC component is configured to activate at less than 7 parallel hardware streams when the downlink cellular reception is not active.

In example 9, the method as recited in example 1, wherein the transmitted data packets comprise quadrature modulated data packets.

In example 10, the method as recited in any of example 1 to 9, wherein adjusting the programmable chain component comprises adjusting an order of interpolation to obtain a desired sampling rate for modulated outputs of inverse fast fourier transform (IFFT).

In example 11, the method as recited in any of examples 1 to 9, wherein the transmitting Wi-Fi data packets further comprises: performing inverse fast fourier transform (IFFT) of an input signal to generate a modulated output; interpolating modulated output of the IFFT; limiting the interpolated signal; streaming the interpolated signal; clipping the streamed interpolated signal by a frequency hard limiter; sampling the clipped streamed interpolated signal; and converting the sampled interpolated signal into a serial signal, wherein the serial signal amplitude modulates a phase modulated signal in a digital power amplifier (PA) prior to transmission of the data packets.

Example 12 is a device comprising: a digital wireless modem configured to transmit Wi-Fi data packets, wherein the Wi-Fi modem further comprises a programmable chain component to control out-of-band emission level of the transmitted data packets; and a detector component coupled to the wireless modem, wherein the detector is configured to detect and measure wireless modem generated interference, wherein the measurement is utilized by the wireless modem to adjust the programmable chain component.

In example 13, the device as recited in example 12, wherein the programmable chain component comprises: a configurable interpolator configured to interpolate time domain input signal; a frequency soft limiter configured to limit frequency deviation of the interpolated signal; a component configured to control streaming of the soft limited interpolated signal; a frequency hard limiter configured to perform hard limiting or clipping of the streamed interpolated signal; and a fractional sampling rate converter configured to sample the hard limited interpolated signal to another sampling rate.

In example 14, the device as recited in example 13, wherein the component is configured to activate about eight or more parallel hardware streams during when a co-running downlink cellular reception is active.

In example 15, the device as recited in example 13, wherein the component is configured to activate less than seven two parallel hardware streams during when the downlink cellular reception is inactive.

In example 16, the device as recited in example 12, wherein the wireless modem generated interference comprises an interference to a co-running downlink cellular reception or Bluetooth (BT) reception.

In example 17, the device as recited in any of examples 12 to 16, wherein the co-running downlink cellular reception receives a 2G, 3G, or a long term evolution (LTE) signal.

Example 18 is a wireless modem comprising: an inverse fast fourier transform (IFFT) component configured to transform a frequency domain input signal into a time domain input signal; a configurable interpolator configured to interpolate time domain-input signal; a frequency soft limiter configured to limit frequency deviation of the interpolated input signal; a component configured to control streaming of the soft limited interpolated input signal; a frequency hard limiter configured to perform hard limiting or clipping of the streamed interpolated input signal; and a fractional sampling rate converter (FSRC) configured to sample the hard limited interpolated input signal to another sampling rate, wherein the configurable interpolator, frequency soft limiter, component, frequency hard limiter, and the FSRC form a programmable chain component adjusted to control out-of-band emission levels of the Wi-Fi modem in response to a measured Wi-Fi modem generated interference.

In example 19, the wireless modem as recited in example 18, wherein the measured wireless modem generated interference comprises an interference to a co-running downlink cellular reception of a cellular modem.

In example 20, the wireless modem as recited in claim 18, wherein the component is configured to control the streaming through activation of at least two parallel hardware streams when a collocated modem is not active.

In example 21, the wireless modem as recited in any of examples 18 to 20, wherein the collocated modem receives a 2G, 3G, or an LTE signal.

What is claimed is:

1. A method of interference mitigation, the method comprising:
   transmitting data packets by a wireless fidelity (Wi-Fi) modem;
   detecting presence of an active or an inactive cellular modem operation;
   adjusting an emission level of the Wi-Fi modem to operate at a high power or a lower power consumption mode during the detected active or inactive cellular modem operation, respectively, the adjusting of the emission level of the Wi-Fi modem further comprises:
      performing inverse fast fourier transform (IFFT) of an input signal to generate a time domain—input signal;
      interpolating the time domain—input signal;
      limiting a frequency deviation of the interpolated input signal;
      controlling a streaming of the limited interpolated input signal based on the detected active or inactive cellular modem operation, wherein a plurality of parallel connected—coordinate rotation digital computer (CORDIC) components operate at a high power consumption mode during the detected active cellular modem operation by turning ON each of the plurality of parallel connected—CORDIC components;
      clipping the streamed interpolated signal from the parallel connected—CORDIC components;
      sampling the clipped streamed interpolated signal; and
      converting the sampled interpolated signal into a serial signal, wherein the serial signal amplitude modulates a phase modulated signal in a digital power amplifier (PA) prior to transmission of the data packets.

2. The method as recited in claim 1, wherein the active cellular modem operation comprises a 2G, 3G, or a long term evolution (LTE) signal.

3. The method as recited in claim 1, wherein the adjusting of the emission level of the Wi-Fi modem includes controlling an out-of-band emission level of the Wi-Fi modem.

4. The method as recited in claim 1, wherein the plurality of parallel connected CORDIC components operate at low power consumption mode during the detected inactive cellular modem operation by turning ON a fewer number of CORDIC components in the plurality of parallel connected—CORDIC components.

5. The method as recited in claim 1, wherein each (CORDIC) component controls a hardware stream of the Wi-Fi modem.

6. The method of claim 1, wherein the plurality of parallel connected—CORDIC components comprises eight hardware streams of about 320 MSa/s per stream.

7. The method as recited in claim 1, wherein the plurality of parallel connected—CORDIC components are disposed in a programmable chain component of the Wi-Fi modem.

8. The method as recited in claim 1, wherein the plurality of parallel connected—CORDIC components utilizes about two CORDIC components during the detected inactive cellular modem operation.

9. The method as recited in claim 1, wherein the transmitted data packets comprise quadrature modulated data packets.

10. The method as recited in claim 1 further comprising: adjusting an order of interpolation to obtain a desired sampling rate for an output of the inverse fast fourier transform (IFFT).

11. The method as recited in claim 1, wherein the Wi-Fi modem is collocated with the operating cellular modem.

12. A device comprising:
   a digital wireless modem configured to transmit wireless fidelity (Wi-Fi) data packets, wherein the digital wireless modem is configured to control an emission level of the transmitted data packets based on a detected active or inactive transmission by a collocated cellular modem;
   a detector component coupled to the wireless modem, wherein the detector is configured to detect the active or inactive transmission by the cellular modem;
   a programmable chain component disposed within the digital wireless modem, the programmable chain component comprises:
      a plurality of parallel connected—coordinate rotation digital computer (CORDIC) components configured to control streaming of soft limited interpolated input signal based on the detected active or inactive transmission by the cellular modem, wherein the plurality of parallel connected—CORDIC components operate at high power consumption mode during the detected active transmission by turning ON each of the plurality of parallel connected—CORDIC components.

13. The device as recited in claim 12, wherein the programmable chain component further comprises:
   a frequency hard limiter configured to perform hard limiting or clipping of the streamed soft limited interpolated signal from the plurality of parallel connected—CORDIC components; and
   a fractional sampling rate converter configured to sample the hard limited interpolated signal to another sampling rate.

14. The device as recited in claim 12, wherein the parallel connected—CORDIC components comprises parallel hardware streams.

15. The device as recited in claim 12, wherein the cellular modem includes 2G, 3G, or a long term evolution (LTE) signal.

16. The device as recited in claim 12, wherein an operation of the digital wireless modem generates an interference to a co-running cellular modem.

17. The device as recited in claim 12, wherein the plurality of parallel connected—CORDIC components operate at low power consumption mode during the detected inactive cellular modem operation by turning ON a fewer number of CORDIC components in the plurality of parallel connected—CORDIC components.

18. A device comprising:
   a transmitter modem;
   a detector configured to detect an active or an inactive transmission by the transmission modem;
   a wireless fidelity (Wi-Fi) modem configured to operate at a high power or a lower power consumption mode during the detected active or inactive transmission, respectively, the Wi-Fi modem further comprises:
      an inverse fast fourier transform (IFFT) component configured to transform a frequency domain input signal into a time domain input signal;
      a configurable interpolator configured to interpolate time domain—input signal;
      a frequency soft limiter configured to limit frequency deviation of the interpolated input signal;
      a plurality of parallel connected—coordinate rotation digital computer (CORDIC) components configured to control streaming of the soft limited interpolated input signal based on the detected active or inactive transmission by the transmitter modem, wherein the plurality of parallel CORDIC components operate at high power consumption mode during the active transmission by turning ON multiple CORDIC component in the plurality of parallel CORDIC components;

a frequency hard limiter configured to perform hard limiting or clipping of the streamed interpolated input signal from the plurality of parallel connected—CORDIC components; and a fractional sampling rate converter (FSRC) configured to sample the hard limited interpolated input signal to another sampling rate, wherein the new sampling rate comprises data streams utilized to amplitude modulate a phase modulated signal at the transmitter mode.

19. The wireless modem as recited in claim 18, wherein the plurality of parallel connected-CORDIC components operate at low power consumption mode during the detected inactive transmission by turning ON a fewer number of CORDIC components in the plurality of parallel CORDIC components.

20. The wireless modem as recited in claim 18, wherein the detector is configured to detect and measure interference between collocated transmitter modem and Wi-Fi modem.

21. The wireless modem as recited in claim 20, wherein the transmitter modem receives a 2G, 3G, or an LTE signal.

* * * * *